June 30, 1970 G. R. PULLIAM ET AL 3,518,636

FERRITE MEMORY DEVICE

Filed Jan. 26, 1965 2 Sheets-Sheet 1

INVENTORS
GEORGE R. PULLIAM
JOHN L. ARCHER

BY L. Lee Humphries

ATTORNEY

INVENTORS
GEORGE R. PULLIAM
JOHN L. ARCHER
BY
L. Lee Humphries
ATTORNEY 3,518,636

FERRITE MEMORY DEVICE

George R. Pulliam and John L. Archer, Anaheim, Calif., assignors to North American Rockwell Corporation, a corporation of Delaware Filed Jan. 26, 1965, Ser. No. 428,158
Int. Cl. G11c *11/14*; H01f *10/02*
U.S. Cl. 340—174 7 Claims

ABSTRACT OF THE DISCLOSURE

A ferrite memory device comprising first and second crossed arrays of conductors embedded in a layer of single crystal ferrite. In a preferred embodiment, the ferrite is epitaxially disposed on a monocrystalline substrate. The device may be fabricated by chemical vapor phase deposition of a first layer of single crystal ferrite epitaxially on a single crystal substrate, depositing a first set of conductors on the layer, providing insulation over portions of the conductors, depositing a second array of conductors crossing said first conductors at the insulated portions thereof, and depositing additional single crystal ferrite atop the original layer so as to substantially embed the conductors in monocrystalline ferrite.

This invention relates to a magnetic memory device and processes for producing it, and more particularly to a single crystal ferrite memory device and a vapor deposition process for producing it.

Advancing computer technology requires improved data storage or memory devices. Existing magnetic memory devices have various limitations. For example, magnetic surface recordings on tapes, drums, disks, and cards are limited in speed and size because of the mechanical elements involved. Electronically addressable core matrix elements are limited in size by the requirement for windings about each magnet core. Further, the information retrieval must be nondestructive of the stored information or else means must be provided to reconstruct and restore information which is read but is desired to be retained in the memory. For many applications other parameters in addition to high speed and small size such as cost, reliability or power dissipation may also be important.

Accordingly, it is an object of this invention to provide an improved magnetic memory device.

It is another object of this invention to provide processes for producing this magnetic memory device.

It is a further object of this invention to provide a small, light-weight, high-density, high-speed and non-destructive-readout magnetic memory device.

In accordance with the present invention, a magnetic memory device is prepared by providing a single crystal ferrite body which is magnetically anisotropic and is more easily magnetized in a given crystallographic direction. In one embodiment of the invention, a plurality of electrical conductors in insulated crossover relationship are incorporated and substantially surrounded by the ferrite body so that a magnetic orientation is obtained therein. In another embodiment of the present invention, the magnetic memory device comprises a first single crystal substrate on which a single crystal body is epitaxially deposited. At least two electrical conductors in insulated crossover relationship are disposed on the ferrite surface. Overlying these conductors is a second single crystal ferrite body in crystallographic relation to the first body so that at least the conductor crossover point is substantially surrounded by ferrite material, a substantial portion of which is single crystal ferrite material. The remainder of the material may be magnetic material in any form.

In another embodiment of the present invention, after the electrical conductors are disposed on the single crystal ferrite surface in a preselected direction relative to the crystal ferrite and appropriately insulated at the crossover point, additional single crystal ferrite material is deposited thereover so as to encapsulate at least the crossover point in single crystal ferrite material. For example, the direction of the conductors might be parallel to a selected crystal direction. It is a preferred feature of the process of the present invention that the ferrite body is formed by reacting selected metal halides and water vapor to epitaxially deposit the ferrite material in a preselected crystallographic form.

Other objects and features of the invention will become apparent from the following description taken in light of the figures in which FIG. 1 is a representation of an apparatus used in producing an epitaxial ferrite memory device.

Figures 1, 2:
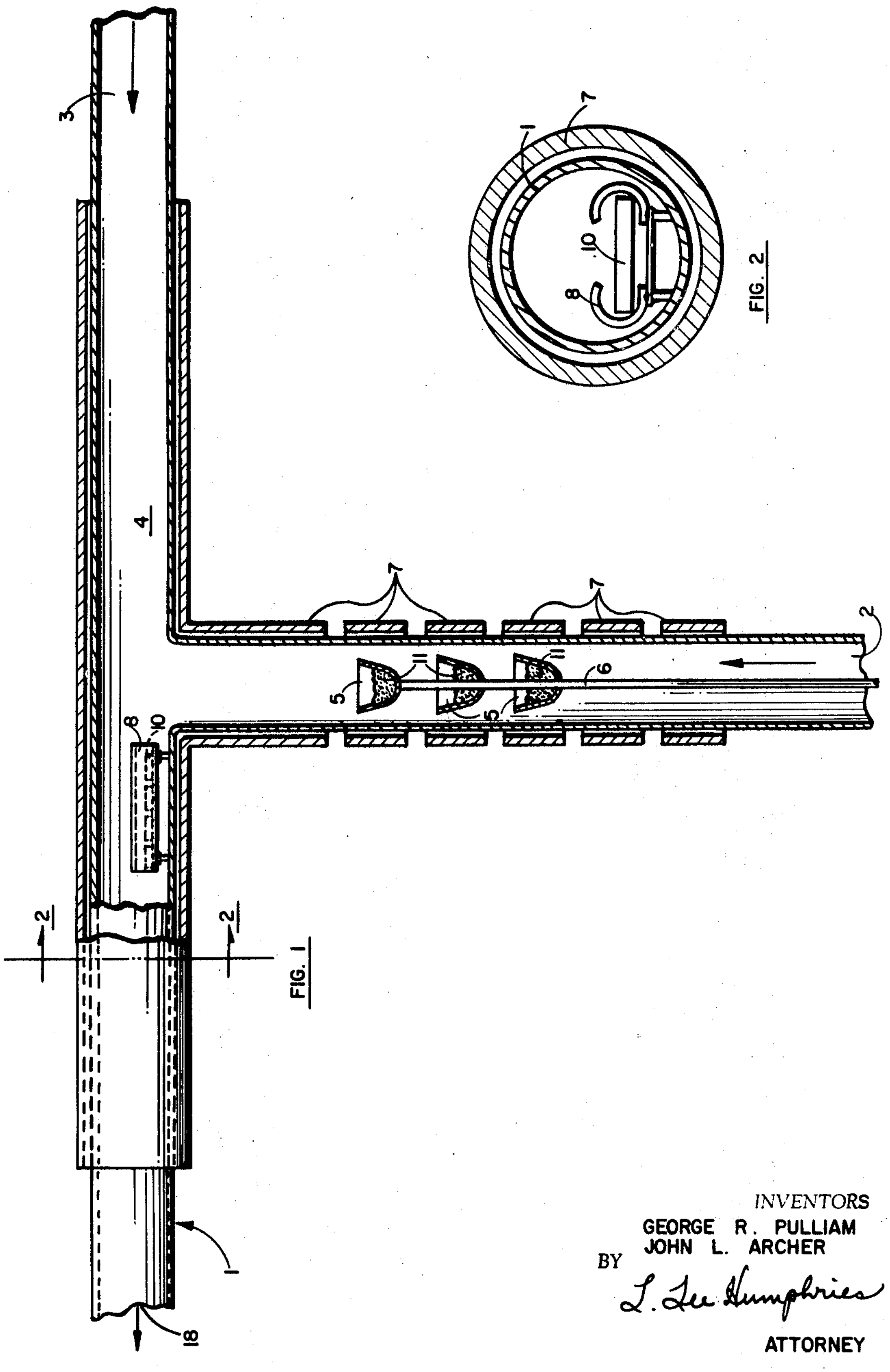
FIG. 2 is a cross-sectional view of the apparatus used in producing a ferrite memory device.

Referring now to FIG. 1, the apparatus of the present invention comprises a chamber 1, preferably of T shape and including inlet means 2 for injecting gases into one end of the chamber 1, and an exhaust 18 at the other end of member 4. The cross member 4 is surrounded by a heating element to control the temperature within the member 4. Supported inside chamber 1 are a plurality of spaced crucibles 5. The spaced crucibles are each attached to a central holder rod 6 which may be maintained in its central position by any well-known means. Adjacent to the outer surface of chamber 1 and positioned to surround each crucible 5 is a heater element 7. Each element 7 may be controlled independently so that the zone in which each crucible 5 is located may be heated to a preselected temperature. Within the cross member 4 is a quartz holder on which substrates or crystals 10 are supported. The crystals 10 are located along cross member 4 from a point where chamber 1 joins the cross member 4 toward the exhaust port so that each is exposed to a mixture of the gases flowing from inlets 2 and 3. Inlet 2 is connected to a source (not shown) of a dry mixture of He and Ar. Inlet 3 is connected to a source (not shown) in which helium, argon and oxygen are bubbled through water to produce a mixture of inert gases, water vapor, and oxygen, e.g., He, Ar, $H_2O$ and $O_2$.

The substrates 10 on which the ferrite crystal is deposited or grown is comprised of a material having crystal structure similar to that to be deposited. For the purpose of describing the invention, the substrate material selected is MgO, although other substrate materials, e.g. $MgAl_2O_4$, $Al_2O_3$ and other materials having the formula $Me'Me_2''O_4$ may also be utilized. Me' and $Me_2''$ are defined herein.

The substrate 10 may be prepared by cleaving optical grade MgO along a (100) cleavage plane or by cutting the MgO into plates of desired configuration along its other crystal faces. The plates are ground flat to produce a plate having a selected size and then chemically polished in an acid etch solution.

The substrates 10 are supported on holder 8 inside the cross member 4 and the ferritic layer is deposited as described in detail hereinafter.

The source materials 11 for producing the ferrite deposit on the substrates 10 are placed in containers 5 and heated to vaporization by various furnace means 7. The source materials placed inside containers 5 may be $Me'X_a$, $Me''X_a$ or a mixture thereof where Me' may be Li, Mg, Mn, Fe, Co, Ni, Cu, Zn, or Cd; where Me'' may be Al, Cr, Mn, Fe, or Ti; and where X is a halide, (F, Cl, Br, I), provided that one of the Me′ or Me″ is Fe, and the subscript "*a*" is either 1, 2, 3 or 4 to correspond with the valence of the cation. Simultaneously with the heating of material 11, the above described carrier gases are admitted through inlets 2 and 3.

The following reaction takes place at the surface of the substrates 10 to deposit a ferrite film in the MgO substrate crystals:

$$Me'X_2+2Me''X_a+3H_2O+\tfrac{1}{2}O_2+\text{inert gases} \underset{\rightarrow}{\triangle} Me'(Me''+FeF)_2O_4+6HX+\text{inert gases}$$

The term ferrite, as used herein, refers to compositions of ferrous-ferric iron oxides or iron oxides in chemical combination with a least one other metallic oxide to form a magnetic material. Thus, the expression $$Me'(Me''+Fe)_2O_4$$

refers generally to these ferrite materials without reference necessarily to any particular stoichiometric or empirical composition. Most ferrites of commercial interest consist of one or two metallic oxides in chemical combination with iron oxide. Thus the ferrites formed are preferably those of commercial interest having low coercive forces, e.g., $MnFe_2O_4$, $NiFe_2O_4$, $MgFe_2O_4$, $ZnFe_2O_4$, $CuFe_2O_4$, and combinations of these compounds. Other ferrite material may be used depending upon the desired application.

After the first ferrite layers are deposited on the substrates, the substrates are removed and placed in a conventional vacuum deposition chamber (not shown). In the chamber, one or more conductors comprising a first array of parallel conductors are deposited on the substrate surfaces in a preselected direction relative to the crystalline structure of the ferrite, by methods well-known in the art, e.g., vacuum deposition or sputtering. Electrically conductive materials such as gold, silver, platinum, or copper may be used, however gold is preferred because of its excellent electrical characteristics. These conductors are appropriately oriented with respect to the crystal plane so that given modes of magnetization occur along different directions. (See Smith et al., Ferrites—John Wiley & Sons, 1959.)

After the first array of conductors is deposited, patterns of insulation material are deposited in a selected pattern to coat portions of the conductors of the first array. Such insulation materials as MgO, $Al_2O_3$ and $BaF_2$ may be deposited by standard deposition techniques. Subsequently, one or more conductors constituting a second array of conductors are vacuum deposited in a manner so as to crossover at a preselected angle to the first array and yet be insulated therefrom by the insulation materials previously deposited. If desired, third and fourth arrays of conductors may be deposited in a similar crossover arrangement to form a stack of arrays in which the conductors of adjacent arrays are insulated at the crossover point. The method of depositing subsequent arrays of conductors are similar to the method of depositing the first array and is therefore not described in detail.

After a preselected number of conductor arrays have been deposited with appropriate insulation at each crossover point, the substrate is preferably placed in the chamber and a second ferrite body is deposited on the existing ferrite layer and around the conductors to encapsulate the conductor arrays within the single crystal ferrite mass. Alternatively, a second body of single crystal ferrite may be physically positioned or placed on the deposition conductors to substantially surround the conductors with ferrite. This latter arrangement, however, creates an air gap which decreases the device efficiency.

Also, instead of encapsulating a plurality of conductor patterns or arrays, it may be preferable in some instances to encapsulate a single conductor array and then deposit a second array and encapsulate it. In that embodiment, single crystal ferrite would separate the conductor arrays whereas in the previous embodiment, the conductor arrays were separated by an insulation material other than the ferrite.

In another embodiment, the single crystal ferrite material may form only one portion of the encapsulation or encircling media and another, possibly polycrystalline, ferrite material may comprise the remainder to complete the flux loop.

FIG. 2 is a cross-sectional view of the chamber illustrating with greater clarity the position of the cross member 4 and crystals 10 inside the chamber.

Figure 4:
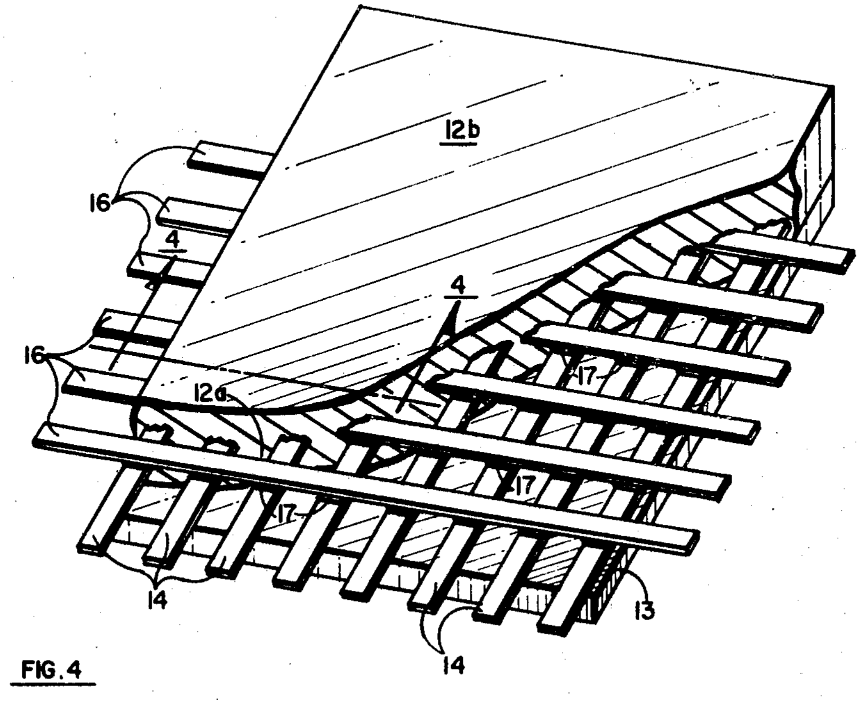
FIG. 4 is a pictorial representation of a memory system utilizing the device of the present invention.
Figure 3:
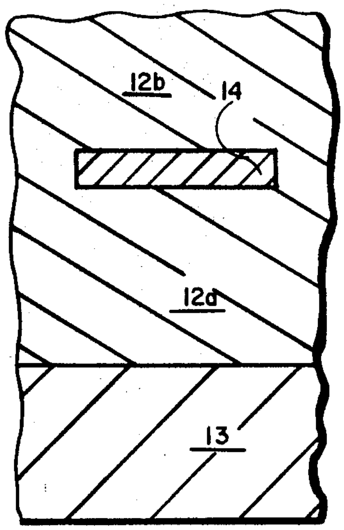
FIG. 3 is a cross-section of a portion of the device of the present invention.

In FIG. 3 a cross-section of an encapsulated conductor fabricated in accordance with the above described preferred processes is illustrated. As shown therein, layer **12*a* represents the first ferrite deposition layer on substrate 13, conductor array 14 represents one of the conductors of an array, while the second conductor array ferrite material 12*b* provides the completion of the encirclement or encapsulation. A pictorial representation of the device shown in FIG. 3 is shown in FIG. 4, which shows the plurality of conductor arrays 14 and 16 angularly disposed with each other, whose encirclement is completed by the ferrite 12*b*. Ferrite has been deposited on a substrate 13 and the conductors are insulated from each other by insulation 17**.

Figure 5:
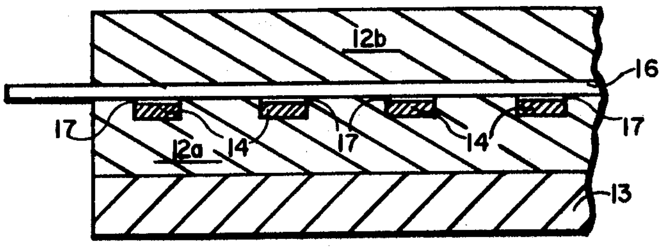
FIG. 5 is a cross-section view of the device showing insulation between the conductors.

FIG. 5 is a cross-section view of a portion of FIG. 4 showing insulation 17 between conductor arrays 14 and 16.

The method of producing epitaxial ferrite memory devices in accordance with the processes of the present invention is described more fully with reference to the following examples.

EXAMPLE I

The substrate material, MgO, is prepared by cleaving the crystal along a (100) cleavage plane into approximately one-inch square substrates. After cleaving, the substrate is mechanically ground flat on a series of metallographic papers to the 4/0 size. They are then chemically polished in a 3:1, concentrated $H_3PO_3$: concentrated $H_2SO_4$ etching solution heated to 125° C. for two hours. After the two-hours of etching, the substrates are given a thorough hot water rinse.

A quartz T shaped apparatus of FIG. 1 having a 45 mm. I.D., was utilized as the deposition chamber. A quartz holder is used to support a plurality of MgO crystals in the middle of the cross member 4 of the apparatus. Quartz crucibles 5 supported by quartz rods 6 contained the source materials 11. These crucibles are each carefully located in the chamber 1 with each source material having an individually controlled electrical heater 7. In this example, the source materials are $MnBr_2$, $FeBr_2$ and$NiBr_2$, arranged in the chamber 1 in the stated order from top to bottom. This order is determined by the temperatures necessary to volatilize the various source materials. After the crystals and the containers are placed in the cross member 4, the gas flows are adjusted and the cross member 4 and suspended substrate 10 are heated to the desired temperature of about 1000° C. The various heating elements 7 for the source materials 11 in the chamber 1 are then turned on. The $MnBr_2$ is heated to about 800° C., the $FeBr_2$ to about 700° C. and the $NiBr_2$ to about 600° C.

To obtain maximum interaction between the source material vapors, mixtures of helium and argon are used to carry the source material vapors and the water vapor into contact with the substrate surfaces. A mixture of 5 cubic feet per hour of He and 10 cubic feet per hour of Ar is used to carry the source material vapors. A mixture of 6 cubic feet per hour of He and 3 cubic feet per hour of Ar is used to carry the water vapor. When the desired temperatures are reached, the carrier gases are rechanneled through a water bubbler, thus causing water vapor to be carried into the reaction chamber. Ferrous iron ($Fe^{+2}$) is oxidized to ferric iron ($Fe^{+3}$) by the addition of 0.08 cubic foot per hour of $O_2$ to the reaction chamber at the time the desired temperature is reached.

The reaction to form the ferritic layer was as follows:

$$0.3\,MnBr_2 + 0.55\,NiBr_2 + 2.15FeBr_2 + 3H_2O + \tfrac{1}{2}O_2 \xrightarrow[(He,\,Ar)]{1000^\circ\,C} Mn_{0.30}Ni_{0.55}Fe^{+2}_{0.15}\,Fe_2^{+3}O_4 + 6HBr$$

As a result of this reaction, an epitaxial, single crystal ferrite layer or body is deposited on the MgO substrate.

X-ray examination may be utilized to confirm that the ferrite layer is a single crystal.

The crystal is then placed in a conventional vacuum chamber for deposition of the first gold conductor array through a mask positioned on ferrite layer. This array may be deposited parallel with the 110 or 100 crystal directions.

The gold conductors were 2 mils wide and 0.25 mil thick and were spaced on 10 mil centers on the substrate layer. The conductor size may be varied. The conductor mask is then removed and replaced by a transverse mask for depositing insulation material on the conductors. The insulation, $BaF_2$, may be limited by a mask or equivalent mechanism to the conductors at the point of crossover. On the other hand, it may also cover the entire array of conductors and etched to produce the desired arrangement of insulation pads. The insulation material may be deposited by any method well-known in the art.

After the insulation deposition was completed, a second mask is inserted into the chamber to define a second array of conductors disposed crosswise at a preselected angle to the first deposited conductor array. The preselected angle of the second array in this example was normal to the first, although other angular relationships may be utilized. In this manner, the second array of deposited conductors overlaps the first conductor array in crossover relation and is insulated therefrom by the insulation material previously deposited.

After the second conductor array is deposited, the substrate with the conductors thereon is placed in the reaction deposition chamber of FIG. 1 and a second layer of single crystal ferrite is deposited as described above. The second layer of ferrite single crystal, together with the first ferrite layer on which it was deposited, encapsulates and completely encloses the conductor arrays within the single crystal epitaxial ferrite, thereby providing an epitaxial ferrite memory device. In this embodiment, the second layer of ferrite crystal is a continuation of the single crystalline structure of the first layer building up around the conductors.

EXAMPLE II

Using the apparatus and process steps of Example I, the substrate material is cut so as to provide a (110) crystallographic plane as the substrate surface. The conductor arrays are then deposited on a ferrite layer, as described above, parallel to the <001> direction in the (110) plane or at 45° to that direction. The single crystal ferrite layer was then deposited as described in Example I, thereby providing an epitaxial ferrite memory device.

EXAMPLE III

Using the apparatus and process steps of Example I, the substrate material is cut so as to provide a (111) crystallographic plane as the substrate surface. The conductor arrays are then deposited, as described above, parallel to the <111> direction in the (111) plane or parallel to the <112> direction, thereby providing an epitaxial memory device.

EXAMPLE IV

Using the apparatus and process steps described in connection with Example I, and a substrate material of (100) MgO, a third conductor array acting as a sense line was deposited at an angle of 45° to the first and second deposited conductor arrays and insulated from the adjacent array at the crossover point. The third conductor array in this example may be used to sense, or read, magnetization. However, read out may also be accomplished with the two conductor array embodiments.

EXAMPLE V

Using the apparatus source materials and process steps described in Example I, the temperature of the source material heaters was varied to produce controlled variations in the ferrite compositions. The source temperature range was from about 500° C. to about 900° C. with the ferrite composition varying from high nickel and low manganese ferrites to low nickel and high manganese ferrites. Thus, by appropriate selection of the temperature the deposition may be controlled to provide a desired ferrite composition. All temperature conditions within the range produced single crystal ferrite memory devices of acceptable quality.

EXAMPLE VI

Using the apparatus and process steps described in Example I, the bromides of Mg and Co were substituted for the bromides of Mn and Ni utilized in Example I. The modified process produced single crystal ferrite memory devices of acceptable quality.

EXAMPLE VII

The apparatus and process steps of Example I were utilized except that single crystal $MgAl_2O_4$ was used as the substrate material. In this example the $MgAl_2O_4$ is cut to provide the proper face using a diamond saw since no usable cleavage faces are available. The $MgAl_2O_4$ crystals were prepared using a $H_3PO_4$ acid polishing solution. The (100) face substrate was treated at 330° C. (the metaphosphoric range) while the (110) and (111) faces use an acid polish at 260° C. (the pyrophosphoric range). The ferrite deposition, gold conductor deposition, and insulating steps and conditions were the same as utilized in Example I. The modified process produced single crystal ferrite memory devices of acceptable quality on a $MgAl_2O_4$ substrate.

EXAMPLE VIII

An epitaxial ferrite film was deposited on an MgO substrate and a pair of gold conductors were deposited in crosswise and insulated relationship on the ferrite layer as described in Example I. The width of the conductors was 2 mils. A second epitaxial ferrite layer on an MgO substrate, grown separately, was then physically placed atop the first film and deposited conductors. The second crystal had the same orientation as the first and proper positioning was achieved by aligning the corresponding edges of the two crystals. The conductors were not completely encapsulated as in the previously described examples but were substantially surrounded by the two bodies of ferrite material. The configuration operated as a nondestructive read-out memory. Switching currents were of the order of 75 ma. for writing. With read current of 50 ma., a signal of 5 ma. was obtained. The read and write currents were higher in this device produced by the process of the example than those required in the above examples, because of the small air gap introduced by mechanically placing the second epitaxial ferrite layer on the first.

In the previous example, coincidence storing was used to store an impulse. Also, read out was achieved by sensing a selected conductor line while a pulse was passing through an intersecting conductor line. It should be understood that other techniques well known in the art in addition to coincidence storing may be used in writing or storing impulses. For example, the linear select system may be used. Similarly it should be appreciated that other methods or systems may be used for reading out stored information.

Other variations may be made without departing from the spirit and scope of the invention. For example, other conductors as well as array orientations may be utilized.

Further, the air gap resulting from the physical placement of a second ferrite single crystal on the first, as described in Example VIII, may be reduced by appropriately forming grooves in the second ferrite crystal by standard etching techniques. These and other modifications in the processes of the present invention will be apparent to those skilled in the art. Therefore, the present invention is not limited to the specific details of the examples described but only by the appended claims.

We claim:

1. A process for producing a ferrite memory device supported on a monocrystalline ferrite substrate, comprising the steps of:
- chemically vapor depositing a monocrystalline ferrite compound on said substrate by reaction of oxygen and water vapor with at least two metal halides consisting of an iron halide and another halide having at least one metallic element selected from the group consisting of lithium, magnesium, manganese, cobalt, nickel, copper, zinc, aluminum or chromium thereby forming a ferrite body on said substrate;
- positioning at least a first conductor on said ferrite body;
- insulating at least one selected portion of said first conductor;
- positioning at least a second conductor across said first conductor in insulated relationship at the crossover location of said conductors; and
- encapsulating at least the crossover locations of the conductors in said monocrystalline ferrite compound by chemically vapor depositing an additional quantity of said monocrystalline ferrite compound on said monocrystalline ferrite body.

2. The process as recited in claim 1, wherein said substrate is selected from the class consisting of MgO, $MgAl_2O_4$, $Al_2O_3$, and $Me'Me_2''O_4$, and wherein at least one of said Me' and Me'' selected from the class consisting of Li, Mg, Mn, Fe, Co, Ni, Cu, Zn, Al and Cr.

3. The process as recited in claim 1, wherein:
- said ferrite layer and said additional ferrite material each comprise $Me'(Me''+Fe)_2O_4$, wherein said Me' is at least one element selected from the class consisting of Li, Mg, Mn, Fe, Co, Ni, Cu and Zn; and
- wherein Me'' is at least one element selected from the class consisting of Al, Cr, Mn and Fe.

4. The process as recited in claim 1, wherein said ferrite layer and said additional ferrite material each comprise at least one ferrite selected from the class consisting of $MnFe_2O_4$, $NiFe_2O_4$, $MgFe_2O_4$, $ZnFe_2O_4$, and $CuFe_2O_4$.

5. A vapor deposition process for producing a ferrite memory device, comprising the steps of:
- providing a substrate;
- depositing a monocrystalline ferrite layer on said substrate;
- depositing at least a first electrical conductor on one surface of the ferrite layer;
- depositing a strip of insulating material on said one surface and on the exposed surfaces of the first conductor;
- depositing at least a second electrical conductor on the insulating strip across the first conductor; and
- depositing additional monocrystalline ferrite material on the exposed portion of said one surface and building up around at least portions of the conductors to encapsulate said conductors.

6. The process as recited in claim 5, wherein said monocrystalline ferrite layer and said additional ferrite material are produced by vapor deposition from the decomposition of a halide of Fe and a halide of at least one metal selected from the class consisting of Li, Mg, Mn, Co, Ni, Cu, Zn, Al and Cr.

7. The process as recited in claim 6, wherein said halides comprise bromides of Li, Mg, Mn, Fe, Co, Ni, Cu, Al and Cr.

References Cited

UNITED STATES PATENTS

| | | | |
|---|---|---|---|
| 2,938,183 | 5/1960 | Dillon, Jr. | 340—174 |
| 3,148,079 | 9/1964 | Banks et al. | 117—62 |
| 3,195,108 | 7/1965 | Franck | 340—174 |
| 3,308,446 | 3/1967 | Rachman | 340—174 |
| 3,337,856 | 8/1967 | Bate et al. | 340—174 |
| 3,189,973 | 6/1965 | Edwards et al. | 29—25.3 |
| 3,399,072 | 8/1968 | Pulliam | 117—62 |

OTHER REFERENCES

IBM Tech. Disclosure Bulletin, Pugh and Suits, vol. 4, No. 5, October 1961.

JAMES W. MOFFITT, Primary Examiner

U.S. Cl. X.R.

117—239